(12) United States Patent
Wang

(10) Patent No.: US 7,881,049 B2
(45) Date of Patent: Feb. 1, 2011

(54) TRANSMISSION STRUCTURE, INPUT DEVICE, AND DATA PROCESSING SYSTEM

(75) Inventor: Yi-Chen Wang, Yongkang (TW)

(73) Assignee: Darfon Electronics Corp., Gueishan, Taoyuan (TW)

( * ) Notice: Subject to any disclaimer, the term of this patent is extended or adjusted under 35 U.S.C. 154(b) by 0 days.

(21) Appl. No.: 12/632,845

(22) Filed: Dec. 8, 2009

(65) Prior Publication Data

US 2010/0142144 A1    Jun. 10, 2010

(30) Foreign Application Priority Data

Dec. 9, 2008    (TW)   ............................... 97222072 U

(51) Int. Cl.
*H05K 5/00* (2006.01)
*H01H 13/70* (2006.01)
*H01H 5/30* (2006.01)
*H01H 9/26* (2006.01)
*B41J 5/00* (2006.01)
*B41J 11/56* (2006.01)
*G06F 3/02* (2006.01)
*G06F 1/16* (2006.01)
*H03K 17/94* (2006.01)

(52) U.S. Cl. ................. 361/679.11; 200/344; 200/409; 200/5 A; 400/490; 400/682; 345/169; 341/22; 361/679.55; 361/679.09

(58) Field of Classification Search ................. 361/679.55–679.59, 689–711; 200/340, 200/344, 345, 341, 5, 512–520, 304, 67, 200/408, 409; 341/22; 400/490, 682, 488, 400/691, 491.2, 495, 495.1, 496; 345/168–169
See application file for complete search history.

(56) References Cited

U.S. PATENT DOCUMENTS 5,790,370 A * 8/1998 Merkel ................... 361/679.13
6,529,370 B1 * 3/2003 Kamishima ............. 361/679.08
2008/0277254 A1 * 11/2008 Chen .......................... 200/341

FOREIGN PATENT DOCUMENTS

TW             319438        11/1997

* cited by examiner

*Primary Examiner*—Zachary M Pape
*Assistant Examiner*—Jerry Wu
(74) *Attorney, Agent, or Firm*—Winston Hsu; Scott Margo

(57) ABSTRACT

The invention discloses a transmission apparatus set in a data processing system. The data processing system includes a display device and an input device. The display device is connected to the input device through a connecting member. The transmission apparatus includes a pivot, a fixed plate, a movable plate, a sliding member, a pulley, and a cable. When the pivot revolves along with the connecting member, the pivot drives the cable to slide the sliding member, and then moves the movable plate along with a predetermined direction.

15 Claims, 7 Drawing Sheets

TRANSMISSION STRUCTURE, INPUT DEVICE, AND DATA PROCESSING SYSTEM

BACKGROUND OF THE INVENTION

1. Field of the Invention

The invention relates to a transmission apparatus, and more particularly, to a transmission apparatus using a pivot to drive a cable.

2. Description of the Prior Art

With the growth of the information industry, the information equipments also become more and more popular. As to the most widely used computer, there are various brands and types on the market; it is widely applied in families, factories, companies, offices, and schools, and becomes a necessary item for our ordinary life. A well-known computer comprises a desk-top computer and a notebook computer, and most of them need a keyboard for the user to input words.

In the current keyboard of the computer, the keyswitch mainly uses a scissors-type supporting device to couple between the keycap and the substrate, to support the vertical movement of the keycap relative to the substrate and detonate the switch on the substrate. The application of this supporting apparatus is disclosed in "KEYSWITCH WITH SCISSORS-TYPE ARM DEVICE" (TW 319,438).

In general, it is emphasized that the mobile apparatus should be light and thin, so that it is easy to be carried and used. For example, the mobile apparatus such as notebook, PDA, and mobile phone all have the trend of becoming thinner. Therefore, the keyboard of the mobile apparatus should also become thinner. U.S. Pat. No. 5,790,370 discloses "COLLAPSIBLE PORTABLE COMPUTER KEYBOARD STRUCTURE HAVING SPRINGLESS LID-TO-KEYBOARD DRIVE LINKAGE" to provide a function that when the notebook is folded the height of the keyboard can be lowered, so that the entire thickness of the notebook can be also reduced. However, the entire thickness of the notebook can not be further lowered by its height-lowering way to match the trend of becoming thinner of the portable electronic apparatus.

Therefore, the invention provides a transmission apparatus using the pivot to drive the cable, the properties of bendable and few occupied space are used to further reduce the thickness of the electronic apparatus.

SUMMARY OF THE INVENTION

A scope of the invention provides a transmission apparatus using the pivot to drive the cable, to solve the above-mentioned problems.

According to an embodiment, the invention provides a transmission apparatus set in a data processing system, wherein the data processing system has a display device and an input device, and the display device is connected to the input device through a connecting member. The transmission apparatus includes a pivot, a fixed plate, a movable plate, a sliding member, a pulley, and a cable.

In this embodiment, the pivot is set on the connecting member, and the pivot revolves along with the connecting member. The fixed plate is fixed in the input device and includes a set of grooves, and the fixed plate includes a set of first protruding pillars extending from a first face of the fixed plate. The movable plate is set in the input device and movablely set on a second face of the fixed plate relative to the first face; moreover, the movable plate includes a set of second protruding pillars movablely contained in the set of grooves respectively.

The sliding member is set on the first face of the fixed plate, and the sliding member includes a set of first sliding grooves and a set of second sliding grooves, wherein, each of second sliding grooves includes a tilt part respectively. The first sliding groove is used to contain the set of first protruding pillars respectively, and the second sliding grooves is used to contain the set of second protruding pillars respectively. The pulley is set on the fixed plate, and the cable is wound on the pivot and when the pivot revolves along with the connecting member, the pivot drives the cable and the sliding member to slide the sliding member along the direction of the set of first sliding grooves via the set of first protruding pillars, and the set of second protruding pillars of the movable plate slides along the set of tilt parts of the set of the second sliding grooves to move the movable plate along a first direction or a second direction relative to the first direction set on the pulley and connected to the sliding member.

Another scope of the invention is to provide an input apparatus. According to another embodiment, the input apparatus of the invention includes the transmission apparatus and a keyswitch in the above-mentioned embodiment, wherein the movable plate of the transmission apparatus is connected to the supporting component of the keyswitch.

In this embodiment, when the pivot revolves with the connecting member along a first rotation direction, the pivot drives the cable to bring the sliding member according to the first rotation direction to slide the sliding member along a first sliding direction via the set of first protruding pillars and the set of first sliding grooves, and the set of second protruding pillars of the movable plate slides along the set of tilt parts of the set of the second sliding grooves to move the movable plate along a first direction to push the supporting component upward to lift the keycap. On the other hand, when the pivot revolves with the connecting member along a second rotation direction, the pivot drives the cable to bring the sliding member according to the second rotation direction to slide the sliding member along a second sliding direction relative to the first sliding direction via the set of first protruding pillars and the set of first sliding grooves, and the set of second protruding pillars of the movable plate slides along the set of tilt parts of the set of the second sliding grooves to move the movable plate along a second direction relative to the first direction to push the supporting component downward to descend the keycap.

Another scope of the invention is to provide a data processing system. According to another embodiment, the data processing system of the invention includes a display device, a connecting member, a keyswitch, and the transmission apparatus of the above-mentioned embodiments, wherein the display device is connected to the input device through a connecting member, and the movable plate of the transmission apparatus is connected to the supporting component of the keyswitch.

In this embodiment, when the pivot revolves with the connecting member along a first rotation direction, the pivot drives the cable to bring the sliding member according to the first rotation direction to slide the sliding member along a first sliding direction via the set of first protruding pillars and the set of first sliding grooves, and the set of second protruding pillars of the movable plate slides along the set of tilt parts of the set of the second sliding grooves to move the movable plate along a first direction to push the supporting component upward to lift the keycap. On the other hand, when the pivot revolves with the connecting member along a second rotation direction, the pivot drives the cable to bring the sliding member according to the second rotation direction to slide the sliding member along a second sliding direction relative to the first sliding direction via the set of first protruding pillars and the set of first sliding grooves, and the set of second protruding pillars of the movable plate slides along the set of tilt parts of the set of the second sliding grooves to move the movable plate along a second direction relative to the first direction to push the supporting component downward to descend the keycap.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1A:
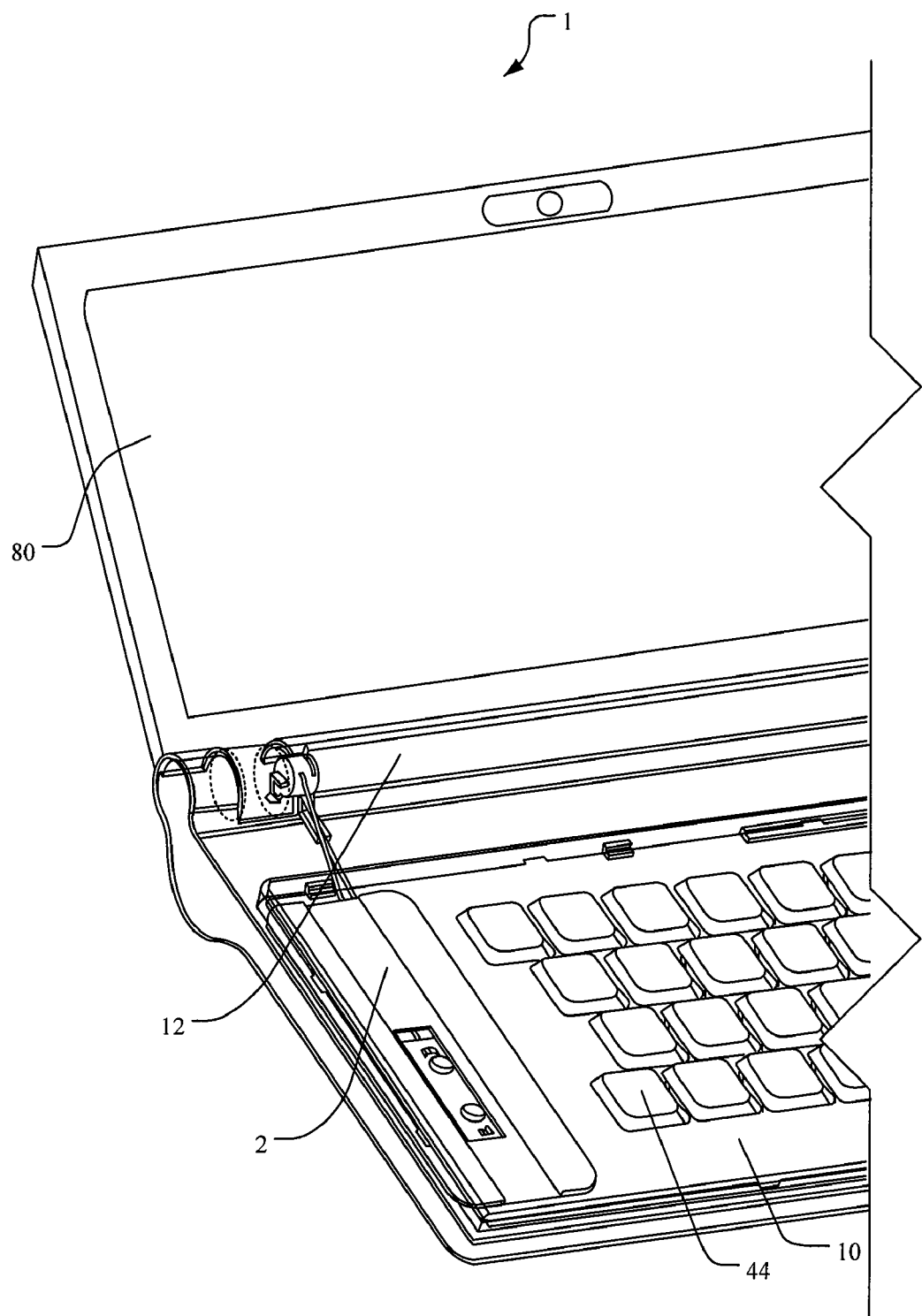
FIG. 1A shows a scheme diagram of the transmission apparatus set on the data processing system according to an embodiment of the invention.
Figure 1B:
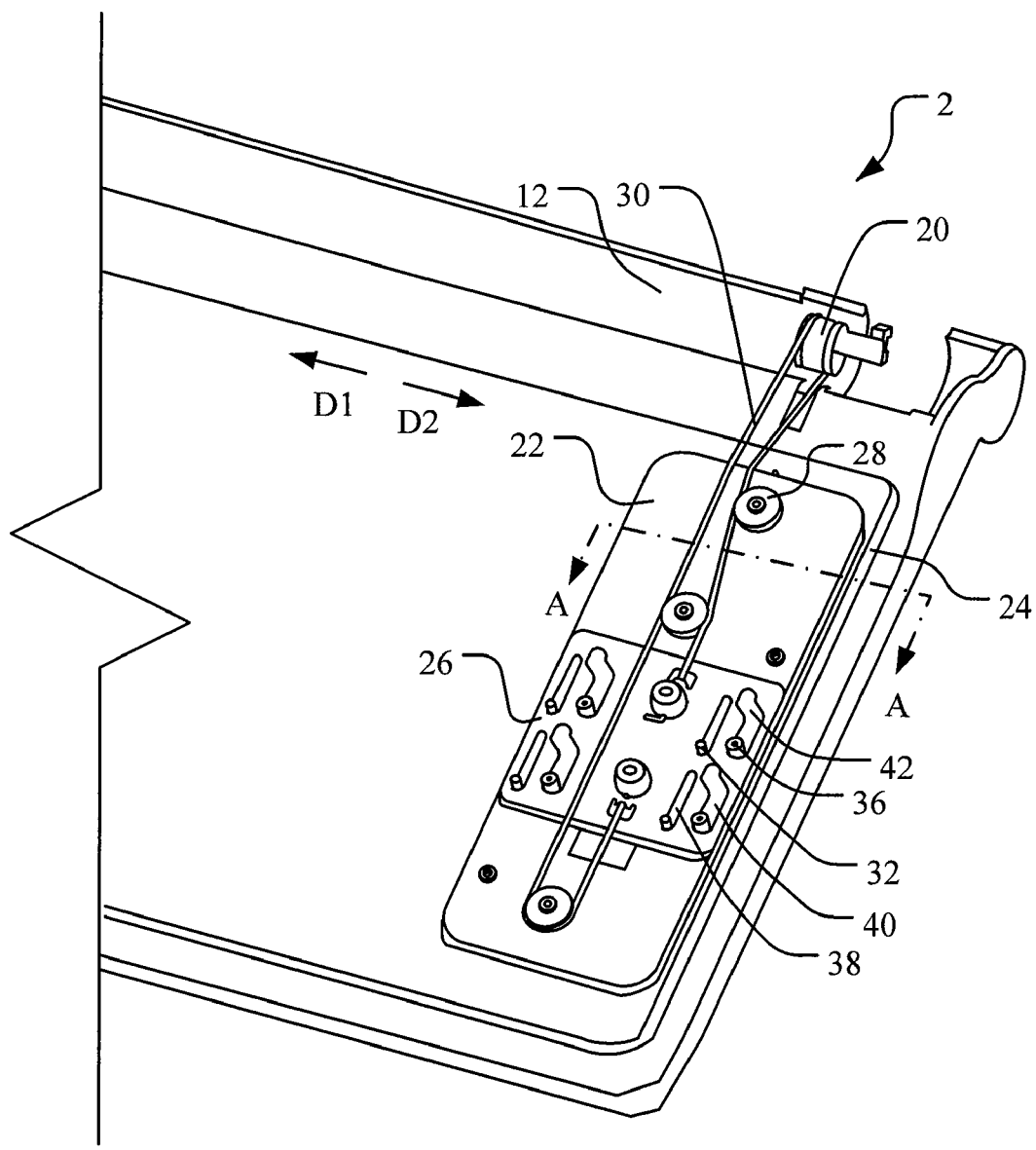
FIG. 1B shows a scheme diagram of the back face of the transmission apparatus shown in FIG. 1A.

Please refer to FIG. 1A and FIG. 1B. FIG. 1A shows a scheme diagram of the transmission apparatus 2 set on the data processing system 1 according to an embodiment of the invention. FIG. 1B shows a scheme diagram of the back face of the transmission apparatus 2 shown in FIG. 1A. As shown in FIG. 1A, the data processing system 1 includes a display device 80 and an input device 10, and the display device 80 is connected to the input device 10 through a connecting member 12.

Figure 2:
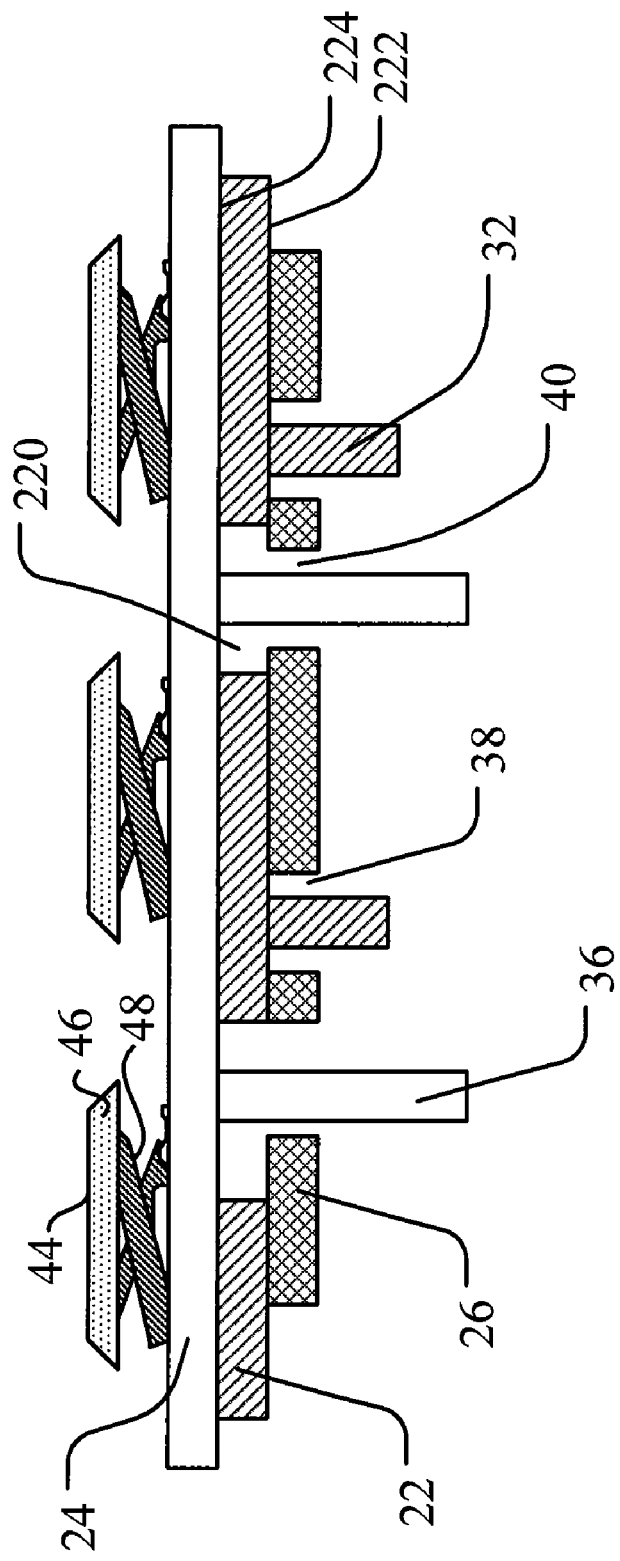
FIG. 2 shows a cross-sectional view of FIG. 1B along the A-A line.

Please refer to FIG. 1B and FIG. 2. FIG. 2 shows a cross-sectional view of FIG. 1B along the A-A line. As shown in FIG. 1B and FIG. 2, the transmission apparatus 2 includes a pivot 20, a fixed plate 22, a movable plate 24, a sliding member 26, a pulley 28, and a cable 30. The pivot 20 is set on the connecting member 12, and the pivot 20 revolves along with the connecting member 12. When the pivot 20 revolves along with the connecting member 12, the pivot 20 drives the cable 30 and the sliding member 26 to slide the sliding member 26. The fixed plate 22 is fixed in the input device 10 and includes a set of grooves 220 and a set of first protruding pillars 32 extending from a first face 222 of the fixed plate 22.

The movable plate 24 is set in the input device 10 and connected to the supporting component 48 under the keycap 46 of the input device 10, wherein the movable plate 24 is movablely set on a second face 224 of the fixed plate 22 relative to the first face 222. Moreover, the movable plate 24 includes a set of second protruding pillars 36 movablely contained in the set of grooves 220 respectively.

In this embodiment, the sliding member 26 is set on the first face 222 of the fixed plate 22, and the sliding member 26 includes a set of first sliding grooves 38 and a set of second sliding grooves 40, wherein each of second sliding grooves 40 includes a tilt part 42 respectively. The first sliding groove 38 is used to contain the first protruding pillar 32 respectively, and the second sliding groove 40 is used to contain the second protruding pillar 36 respectively. The pulley 28 is set on the fixed plate 22, and the cable 30 is wound on the pivot 20 and set on the pulley 28, and connected to the connecting member 26.

Figure 1C:
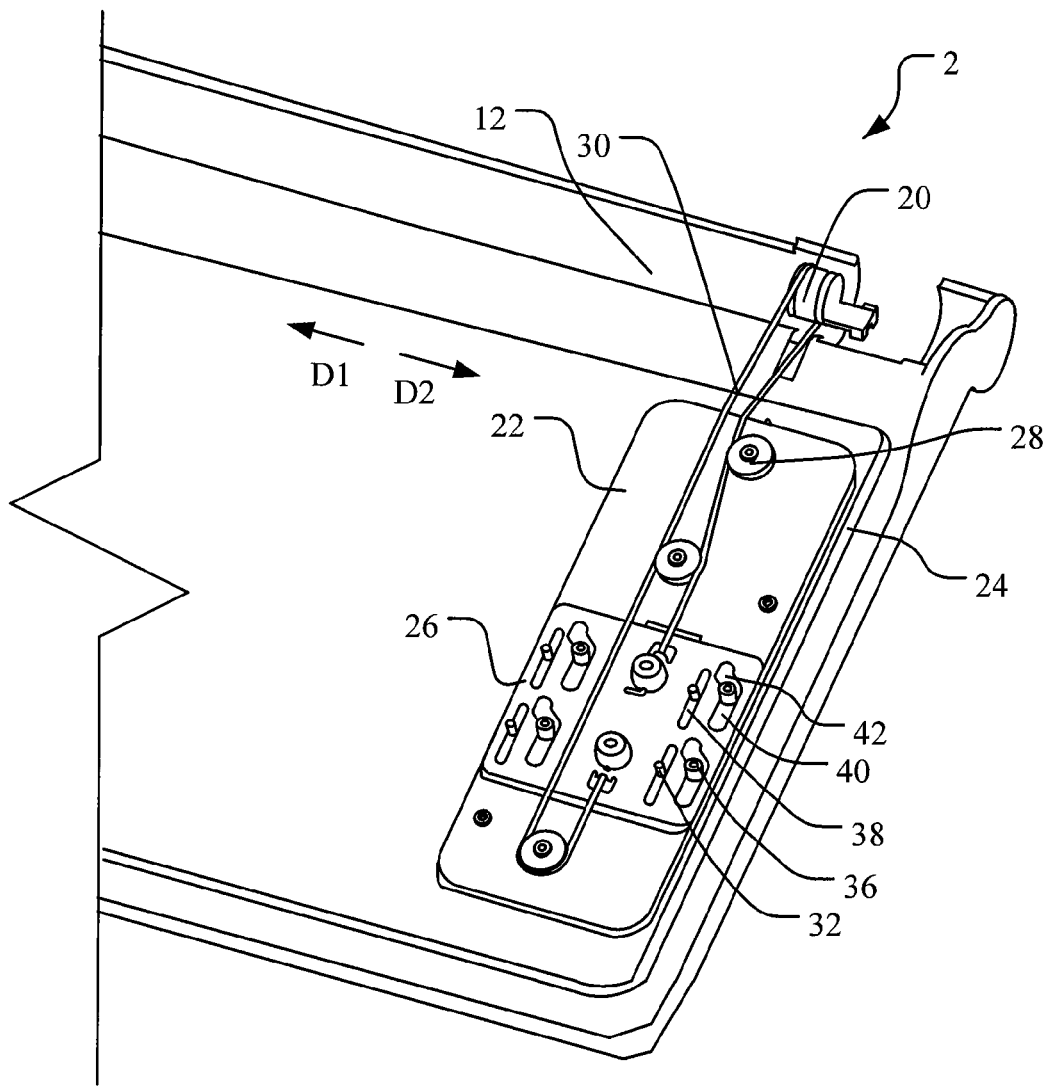
FIG. 1C shows a scheme diagram of the transmission apparatus shown in FIG. 1B when the transmission apparatus is operated.
Figure 1D:
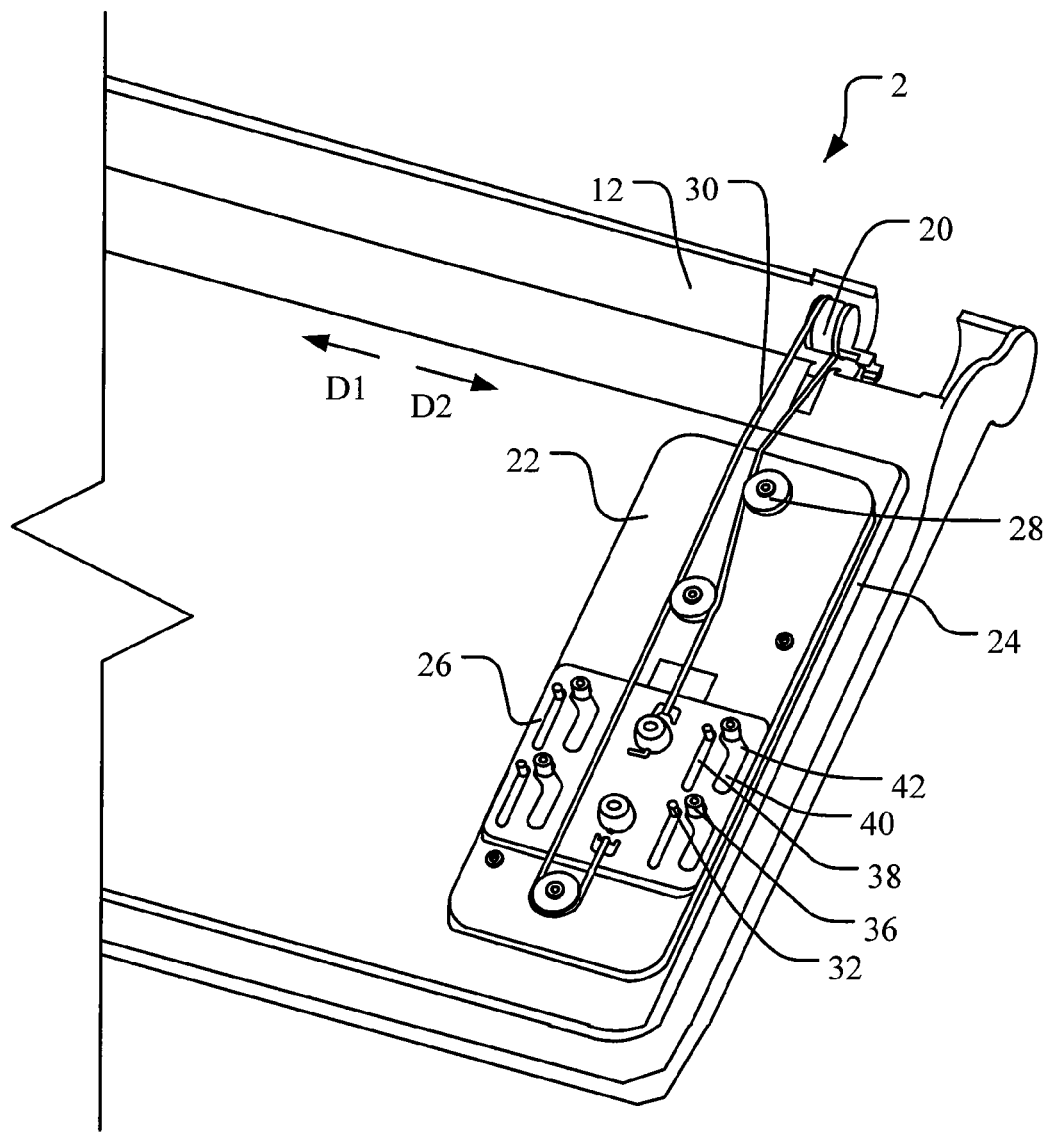
FIG. 1D shows a scheme diagram of the transmission apparatus shown in FIG. 1B after the transmission apparatus is operated.

Please refer to FIG. 1C and FIG. 1D. FIG. 1C shows a scheme diagram of the transmission apparatus 2 shown in FIG. 1B when the transmission apparatus 2 is operated. FIG. 1D shows a scheme diagram of the transmission apparatus 2 shown in FIG. 1B after the transmission apparatus 2 is operated. When the pivot 20 revolves with the connecting member 12, the pivot 20 drives the cable 30 to bring the sliding member 26 to slide the sliding member 26 along the direction of the set of the first sliding grooves 38 via the set of first protruding pillars 32, and the set of second protruding pillars 36 of the movable plate 24 slides along the set of tilt parts 42 of the set of the second sliding grooves 40 to move the movable plate 24 along a first direction D1 or a second direction D2 relative to the first direction D1.

Figure 1E:
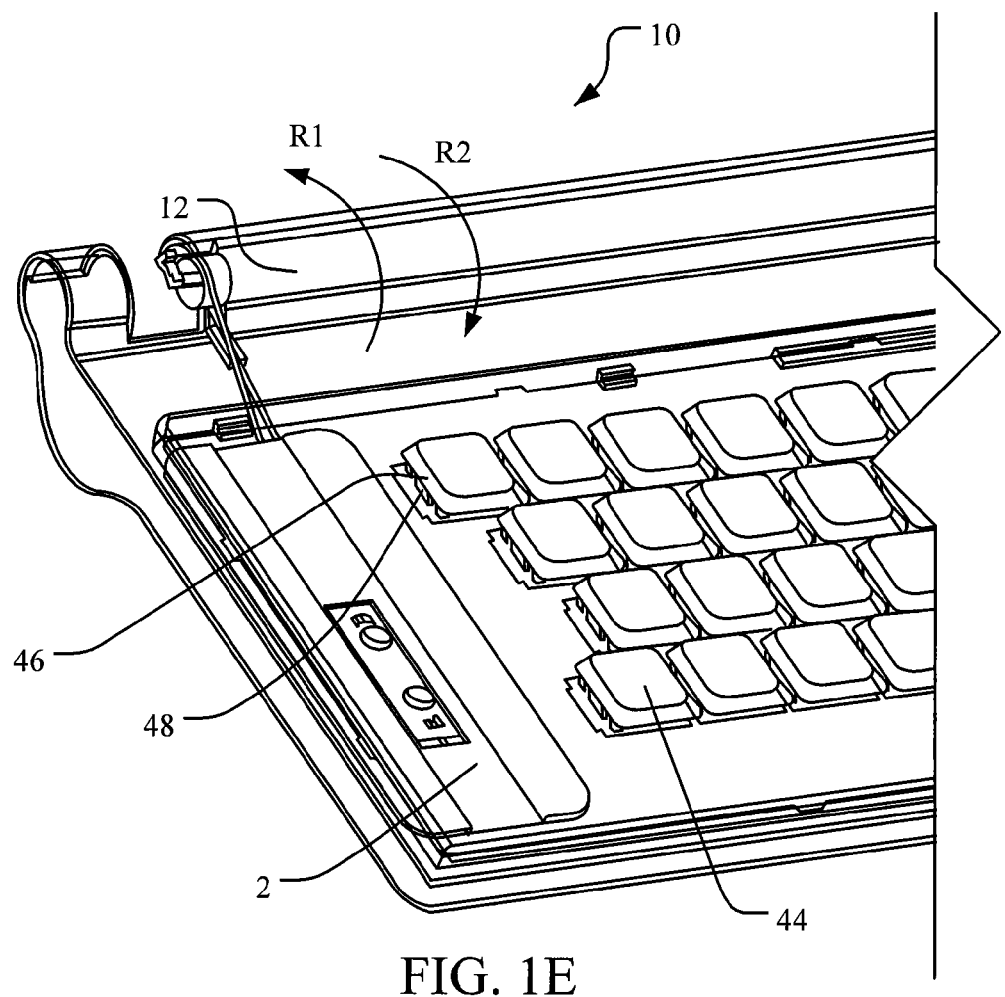
FIG. 1E shows a scheme diagram of the operation of the transmission apparatus shown in FIG. 1A to lift the keycap.
Figure 1F:
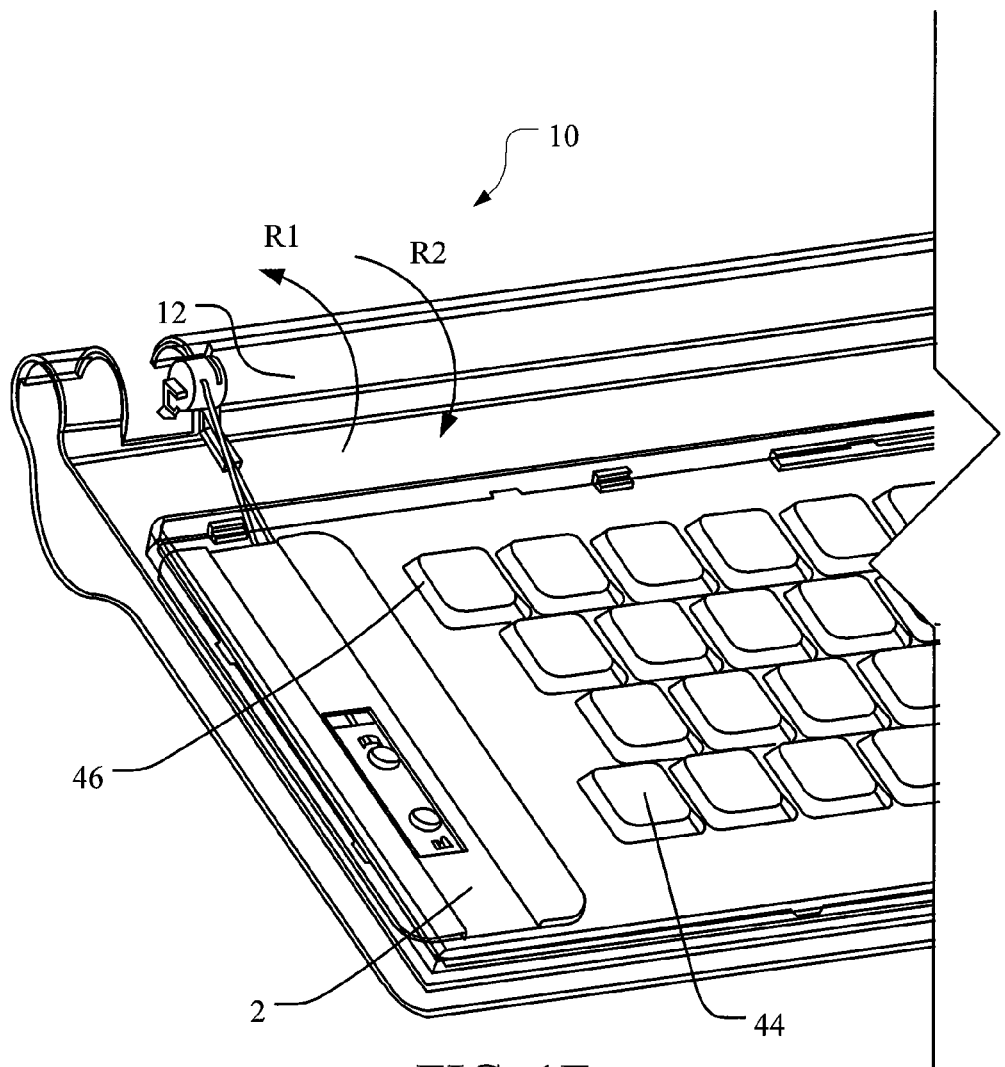
FIG. 1F shows a scheme diagram of the operation of the transmission apparatus shown in FIG. 1A to descend the keycap.

Please refer to FIG. 1E and FIG. 1F. FIG. 1E shows a scheme diagram of the operation of the transmission apparatus 2 shown in FIG. 1A to lift the keycap 46. FIG. 1F shows a scheme diagram of the operation of the transmission apparatus 2 shown in FIG. 1A to descend the keycap 46. When the cable 30 drives the sliding component 26 according to a first rotation direction R1 of the pivot 20, the movable plate 24 moves along the first direction D1 and pushes the supporting component 48 upward to lift the keycap 46, as shown FIG. 1E. When the cable 30 drives the sliding component 26 according to a second rotation direction R2 relative to the first rotation direction R1 of the pivot 20, the movable plate 24 moves along the second direction D2 and pushes the supporting component 48 downward to descend the keycap 46 of the keyswitch 44, as shown FIG. 1F.

It should be noticed that in the above-mentioned embodiments, the method of moving the movable plate along the first direction or the second direction to push the supporting component upward or downward to lift or descend the keycap has been disclosed in U.S. Pat. Nos. 7,034,718 and 7,022,927, therefore, it is not mentioned again here.

According to the transmission apparatus 2 provided by the invention, when the input device 10 and the display device 80 are spread relatively to rotate the connecting member 12 and the pivot 20 along the first rotation direction R1 to lift the keycap 46, as shown in FIG. 1E. The input device 10 and the display device 80 are folded relatively to rotate the connecting member 12 and the pivot 20 along the second rotation direction R2 to descend the keycap 46 of the keyswitch 44, as shown in FIG. 1F.

Please refer to FIG. 1A, FIG. 1B, and FIG. 1E. According to another embodiment, the invention provides an input device 10. As shown in FIG. 1A, the input device 10 of the embodiment is a keyboard, set in a data processing system 1 and connected to a display device 80 of the data processing system 1 through a connecting member 12. It should be noticed that in fact, the input device 10 can not be limited to the keyboard. As shown in FIG. 1E, the input device 10 further includes the keyswitch 44 and the transmission apparatus 2. Wherein, the keyswitch 44 includes the keycap 46 and the supporting component 48 set under the keycap 46. As shown in FIG. 1B, the transmission apparatus 2 includes a pivot 20, a fixed plate 22, a movable plate 24, a sliding member 26, a pulley 28, and a cable 30.

In this embodiment, the relationships between the units of the above-mentioned transmission apparatus 2 and the units of the data processing system 1 are the same with the last embodiment, therefore, it is not mentioned again here. Therefore, in this embodiment, when the pivot 20 revolves with the connecting member 12 along a first rotation direction R1 (namely, the input device 10 and the display device 80 are spread relatively), the pivot 20 drives the cable 30 to bring the sliding component 26 according to the first rotation direction R1 to slide the sliding component 26 along a first sliding direction via the set of first protruding pillars 32 and the set of first sliding grooves 38 (the first sliding direction is parallel to the direction of the first sliding groove 38) and the set of second protruding pillars 36 of the movable plate 24 slide along the set of tilt parts 42 of the set of second sliding grooves 40 to move the movable plate 24 along the first direction D1 to push the supporting component 48 upward to lift the keycap 46, as shown in FIG. 1E.

Moreover, please refer to FIG. 1B and FIG. 1F. In this embodiment, when the pivot 20 revolves with the connecting member 12 along a second rotation direction R2 (namely, the input device 10 and the display device 80 are folded relatively), the pivot 20 drives the cable 30 to bring the sliding component 26 according to the second rotation direction R2 to slide the sliding component 26 along a second sliding direction relative to the first direction via the set of first protruding pillars 32 and the set of first sliding grooves 38 (the second sliding direction is parallel to the direction of the first sliding groove 38) and the set of second protruding pillars 36 of the movable plate 24 slide along the set of tilt parts 42 of the set of second sliding grooves 40 to move the movable plate 24 along a second direction D2 relative to the first direction D1 to push the supporting component 48 downward to descend the keycap 46, as shown in FIG. 1F.

Similarly, according to another embodiment, the invention can provide a data processing system including a display device and an input device, wherein in fact, the data processing system can be, but not limited to, a notebook, and the input device can be, but not limited to a keyboard. The display device and the input device are connected via a connecting member.

In this embodiment, the data processing system can further include the transmission apparatus in the above-mentioned embodiments. With the above-mentioned transmission apparatus, the data processing system of the embodiment can lift or descend the keyswitch of the input device according to that the display device and the input device are spread or closed relatively.

Compared to the prior arts, the transmission apparatus using a pivot to drive a cable disclosed in this invention can be used in an input device of a data processing system to drive a keyswitch of the input device to be lifted or descended. The pivot of the transmission apparatus can be set on a connecting member set between the input device and the display device of the data processing system, and the pivot can revolve with the connecting member to drive the movable component of the transmission apparatus to move according to the rotation direction of the pivot, and the movable component can further push the keyswitch to be lifted or descended. With the properties of the cable which is bendable and occupies few space, and the pivot directly connects to the connecting component between the display device and the input device (e.g., the pivot between the monitor and the keyboard of the notebook), the thickness of the portable electronic apparatus can be further reduced.

Although the present invention has been illustrated and described with reference to the preferred embodiment thereof, it should be understood that it is in no way limited to the details of such embodiment but is capable of numerous modifications within the scope of the appended claims.

What is claimed is:

1. A transmission apparatus, set in a data processing system, the data processing system comprising a display device and an input device, the display device being connected to the input device through a connecting member, a keyswitch, comprising a keycap and a supporting member set under the keycap; and the transmission apparatus comprising:
   a pivot, set on the connecting member, the pivot revolves along with the connecting member;
   a fixed plate, fixed in the input device, the fixed plate comprising a set of first protruding pillars extending from a first face of the fixed plate, the fixed plate comprising a set of grooves;
   a movable plate, set in the input device and movablely set on a second face of the fixed plate relative to the first face, the movable plate comprising a set of second protruding pillars movablely contained in the set of grooves respectively;
   a sliding member, set on the first face of the fixed plate, the sliding member comprising a set of first sliding grooves and a set of second sliding grooves, the set of second sliding grooves comprising a tilt part respectively, the set of first sliding grooves being used to contain the set of first protruding pillars respectively and the set of second sliding grooves being used to contain the set of second protruding pillars respectively;
   a pulley, set on the fixed plate; and
   a cable, wound on the pivot and set on the pulley and connected to the sliding member;
   wherein when the pivot revolves along with the connecting member, the pivot drives the cable and the sliding member to slide the sliding member along the direction of the set of first sliding grooves via the set of first protruding pillars, and the set of second protruding pillars of the movable plate slides along the set of tilt parts of the set of the second sliding grooves to move the movable plate along a first direction or a second direction relative to the first direction.

2. The transmission apparatus of claim 1, wherein the movable plate is connected to a supporting component under the keycap of the input apparatus.

3. The transmission apparatus of claim 2, wherein when the cable brings the sliding member according to a first rotation direction of the pivot, the movable plate moves along the first direction to push the supporting component upward to lift the keycap.

4. The transmission apparatus of claim 3, wherein the input device and the display device are spread relatively to rotate the connecting member and the pivot along the first rotation direction.

5. The transmission apparatus of claim 3, wherein when the cable brings the sliding member according to a second rotation direction relative to the first rotation direction of the pivot, the movable plate moves along the second direction to push the supporting component downward to descend the keycap.

6. The transmission apparatus of claim 5, wherein the input device and the display device are folded relatively to rotate the connecting member and the pivot along the second rotation direction.

7. An input device, set in a data processing system and connected to a display device of the data processing system through a connecting member, the input device comprising:

a keyswitch, comprising a keycap and a supporting member set under the keycap; and a transmission apparatus, comprising:

a pivot, set on the connecting member, the pivot revolving along with the connecting member;

a fixed plate, fixed in the input device, the fixed plate comprising a set of first protruding pillars extending from a first face of the fixed plate, the fixed plate comprising a set of grooves;

a movable plate, set in the input device and movablely set on a second face of the fixed plate relative to the first face, the movable plate being connected to the supporting component, the movable plate comprising a set of second protruding pillars movablely contained in the set of grooves respectively;

a sliding member, set on the first face of the fixed plate, the sliding member comprising a set of first sliding grooves and a set of second sliding grooves, the set of second sliding grooves comprising a tilt part respectively, the set of first sliding grooves being used to contain the set of first protruding pillars respectively and the set of second sliding grooves being used to contain the set of second protruding pillars respectively;

a pulley, set on the fixed plate; and a cable, wound on the pivot and set on the pulley and connected to the sliding member;

wherein when the pivot revolves with the connecting member along a first rotation direction, the pivot drives the cable to bring the sliding member according to the first rotation direction to slide the sliding member along a first sliding direction via the set of first protruding pillars and the set of first sliding grooves, and the set of second protruding pillars of the movable plate slides along the set of tilt parts of the set of the second sliding grooves to move the movable plate along a first direction to push the supporting component upward to lift the keycap;

wherein when the pivot revolves with the connecting member along a second rotation direction, the pivot drives the cable to bring the sliding member according to the second rotation direction to slide the sliding member along a second sliding direction relative to the first sliding direction via the set of first protruding pillars and the set of first sliding grooves, and the set of second protruding pillars of the movable plate slides along the set of tilt parts of the set of the second sliding grooves to move the movable plate along a second direction relative to the first direction to push the supporting component downward to descend the keycap.

8. The input device of claim 7, wherein the input device and the display device are spread relatively to rotate the connecting member and the pivot along the first rotation direction, and the pivot drives the cable to bring the sliding member along the first sliding direction according to the first rotation direction.

9. The input device of claim 7, wherein the input device and the display device are folded relatively to rotate the connecting member and the pivot along the second rotation direction, and the pivot drives the cable to bring the sliding member to slide along the second sliding direction according to the second rotation direction.

10. The input device of claim 7, wherein the input device is a keyboard.

11. A data processing system, comprising a display device and an input device, the display device being connected to the input device through a connecting member, the data processing system further comprising:

a keyswitch, set on the input apparatus, the keyswitch comprising a keycap and a supporting member set under the keycap;

a pivot, set on the connecting member, the pivot revolving along with the connecting member;

a fixed plate, fixed in the input device, the fixed plate comprising a set of first protruding pillars extending from a first face of the fixed plate, the fixed plate comprising a set of grooves;

a movable plate, set in the input device and movablely set on a second face of the fixed plate relative to the first face, the movable plate being connected to the supporting component, the movable plate comprising a set of second protruding pillars movablely contained in the set of grooves respectively;

a sliding member, set on the first face of the fixed plate, the sliding member comprising a set of first sliding grooves and a set of second sliding grooves, the set of second sliding grooves comprising a tilt part respectively, the set of first sliding grooves being used to contain the set of first protruding pillars respectively and the set of second sliding grooves being used to contain the set of second protruding pillars respectively;

a pulley, set on the fixed plate; and a cable, wound on the pivot and set on the pulley and connected to the sliding member;

wherein when the pivot revolves with the connecting member along a first rotation direction, the pivot drives the cable to bring the sliding member according to the first rotation direction to slide the sliding member along a first sliding direction via the set of first protruding pillars and the set of first sliding grooves, and the set of second protruding pillars of the movable plate slides along the set of tilt parts of the set of the second sliding grooves to move the movable plate along a first direction to push the supporting component upward to lift the keycap;

wherein when the pivot revolves with the connecting member along a second rotation direction, the pivot drives the cable to bring the sliding member according to the second rotation direction to slide the sliding member along a second sliding direction relative to the first sliding direction via the set of first protruding pillars and the set of first sliding grooves, and the set of second protruding pillars of the movable plate slides along the set of tilt parts of the set of the second sliding grooves to move the movable plate along a second direction relative to the first direction to push the supporting component downward to descend the keycap.

12. The data processing system of claim 11, wherein the input device and the display device are spread relatively to rotate the connecting member and the pivot along the first rotation direction, and the pivot drives the cable to bring the sliding member along the first sliding direction according to the first rotation direction.

13. The data processing system of claim 11, wherein the input device and the display device are folded relatively to rotate the connecting member and the pivot along the second rotation direction, and the pivot drives the cable to bring the sliding member to slide along the second sliding direction according to the second rotation direction.

14. The data processing system of claim 11, wherein the input device is a keyboard.

15. The data processing system of claim 11, wherein the data processing system is a notebook.

* * * * *